United States Patent [19]
Darlington et al.

[11] 3,721,737

[45] March 20, 1973

[54] 2',5'-DIHALO-3-TERT.ALKYL-5-NITROSALICYLANILIDES FOR COMBATTING LEPIDOPTERA CHEWING LARVAE

[75] Inventors: Walter A Darlington, St. Louis; John P. Chupp, Kirkwood, both of Mo.

[73] Assignee: Monsanto Company, St. Louis, Mo.

[22] Filed: Nov. 15, 1968

[21] Appl. No.: 776,276

[52] U.S. Cl. .................................................. 424/230
[51] Int. Cl. ................................................ A01n 9/20
[58] Field of Search ............ 424/233, 230; 260/559 S

[56] References Cited

UNITED STATES PATENTS

| | | | |
|---|---|---|---|
| 2,703,332 | 3/1955 | Bindler et al. | 260/559 |
| 3,079,297 | 2/1963 | Schraufstaher et al. | 424/230 |
| 3,134,711 | 5/1964 | Reller et al. | 424/233 |
| 3,278,372 | 10/1966 | Taborsky | 424/230 |
| 3,309,267 | 3/1967 | Starkey | 424/230 |
| 3,332,996 | 7/1967 | Zerweck et al. | 424/233 X |
| 3,382,145 | 5/1968 | Chupp et al. | 424/230 |
| 3,388,163 | 6/1968 | Early et al. | 424/230 X |
| 3,466,370 | 9/1969 | Broome et al. | 424/233 |

OTHER PUBLICATIONS

Chemical Abstraacts Vol. 60; 10938c, 1960.

*Primary Examiner*—Jerome D. Goldberg
*Assistant Examiner*—Leonard Schenkman
*Attorney*—Neal E. Willis, John J. Henschke, Jr., Albert J. Greene and Fabian A. Brusok

[57] ABSTRACT

Compounds having a 2', 5'-dihalo-3-tert.alkyl-5-nitrosalicylanilido nucleus useful in combatting chewing insect larvae species of the order Lepidoptera, particularly species of the family Noctuidae.

5 Claims, No Drawings

2',5'-DIHALO-3-TERT.ALKYL-5-NITROSALICYLANILIDES FOR COMBATTING LEPIDOPTERA CHEWING LARVAE

This invention relates to new and useful 2',5'-dihalo-3-tert.alkyl-5-nitrosalicylanilides of the general formula

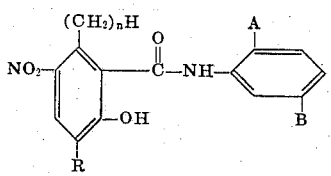

wherein n is an integer from 0 to 1, inclusive, wherein A and B are like or unlike halogens of atomic weight in the range of 18 to 80 (that is fluoro, chloro or bromo, but preferably chloro), and wherein R is $C_{4-5}$ tert.alkyl of the general formula:

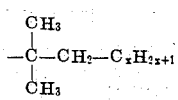

wherein x is an integer from 0 to 1, inclusive, but preferably 0.

The compounds of this invention are high melting solids and are insoluble in water. They are readily prepared by heating at a temperature below about 200°C a substantially equimolecular mixture of a 2,5-dihaloaniline of the general formula

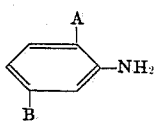

wherein A and B have the aforedescribed significance and a 3-tert.alkyl-5-nitrosalicyclic acid of the general formula

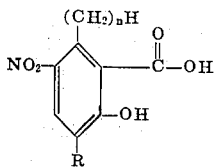

wherein n and R have the aforedescribed significances in the presence of at least about one-third equimolecular amount of phosphorus trichloride in an inert organic liquid medium such as benzene, toluene, xylene, chlorobenzene, dichlorobenzene, or mixtures thereof. These four 3-tert.alkyl-5-nitrosalicylic acid precursors are readily prepared by the well-known procedure for nitrating salicylic acid in the 5-position thereof [note - J.A.C.S., Vol. 44 (1922) p. 791] from a 3 tert.alkyl salicylicylic acid of the general formula

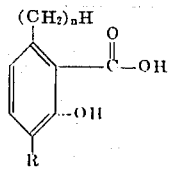

wherein n and R have the aforedescribed significances, dissolved in glacial acetic acid employing 90 percent nitric acid at about room temperature. These four 3-tert.alkyl salicylic acids are readily prepared by carboxylating a 2-tert.alkyl phenol of the general formula

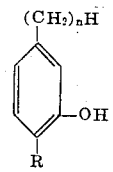

wherein n and R have the aforedescribed significances with carbon dioxide in the presence of aqueous sodium hydroxide in accordance with the Schmitt modification of the Kolbe synthesis (German patents 29,939 and 38,742) and thereafter acidifying the sodium salt so produced with dilute hydrochloric acid.

As illustrative of the preparation of the compounds of this invention but not limitative thereof is the following:

EXAMPLE I

To a suitable reaction vessel equipped with a thermometer, agitator and reflux condenser is charged 2.4 parts by weight (substantially 0.01 mole) of 3-tert.butyl-5-nitro-salicylic acid (which melts with decomposition at about 225°C), 1.6 parts by weight (substantially 0.01 mole) of 2,5-dichloroaniline and approximately 88.5 parts by weight of monochlorobenzene. While agitating the so-charged mass is heated to about 65°C, whereupon 0.45 parts by weight (substantially 0.0033 mole) of phosphorus trichloride in admixture with approximately 12 parts by weight of monochlorobenzene is slowly added. Thereon the mass is heated to the reflux temperature (about 135°C) and refluxed for 10 hours. Upon cooling to room temperature after standing overnight, the monochlorobenzene and other volatiles are stripped off under reduced pressure. The solid residue is first washed with dilute aqueous sodium bicarbonate and then with water. The so-washed solid is then recrystallized from an ethanol-water mixture to give 2',5'-dichloro-3-tert.butyl-5-nitrosalicylanilide, m.p. 190°-191°C.

EXAMPLE II

Employing the procedure of Example I but replacing 2,5-dichloroaniline with an equimolecular amount of 2,5-dibromoaniline there is obtained 2',5'-dibromo-3-tert.butyl-5-nitrosalicylanilide, a solid.

EXAMPLE III

Employing the procedure of Example I but replacing 2,5-dichloroaniline with an equimolecular amount of 2,5-difluoroaniline there is obtained 2',5'-difluoro-3-tert.butyl-5-nitrosalicylanilide, a solid.

EXAMPLE IV

Employing the procedure of Example I but replacing 2,5-dichloroaniline with an equimolecular amount of 2-chloro-5-bromoaniline, there is obtained 2'-chloro-5'-bromo-3-tert.butyl-5-nitrosalicylanilide, a solid.

EXAMPLE V

To a suitable reaction vessel equipped with a thermometer, agitator and reflux condenser is charged 2.8 parts by weight (substantially 0.011 mole) of 3-tert.butyl-6-methyl-5-nitrosalicylic acid (which melts with decomposition at about 212°C), 1.8 parts by weight (substantially 0.011 mole) of 2,5-dichloroaniline and approximately 138 parts by weight of monochlorobenzene. While agitating the so-charged mass is heated to about 60°C, whereupon approximately 0.55 parts by weight (substantially 0.004 mole) of phosphorus trichloride in admixture with approximately 15 parts by weight of monochlorobenzene is slowly added. Thereon the mass is heated to the reflux temperature (about 135°C) and refluxed for 10 hours. Upon cooling to room temperature after standing overnight, the monochlorobenzene and other volatiles are stripped off under reduced pressure. The solid residue is first washed with dilute aqueous sodium bicarbonate and then with water. The so-washed solid is then recrystallized from an ethanol-water mixture to give 2',5'3tert.butyl-6-methyl15-nitrosalicylanilide, m.p. 169°–170°C.

EXAMPLE VI

Employing the procedure of Example V but replacing 2,5-dichloroaniline with an equimolecular amount of 2,5-dibromoaniline there is obtained 2',5'-dibromo-3-tert.butyl-6-methyl-5-nitrosalicylanilide, a solid.

EXAMPLE VII

Employing the procedure of Example V but replacing 2,5-dichloraniline with an equimolecular amount of 2,5-difluoroaniline there is obtained 2',5'-difluoro-3-tert.butyl-6-methyl-5-nitrosalicylanilide, a solid.

EXAMPLE VIII

Employing the procedure of Example V but replacing 2,5-dichloroaniline with an equimolecular amount of 2-chloro-5-fluoroaniline, there is obtained 2'-chloro-5'-fluoro-3-tert.butyl-6-methyl-5-nitrosalicylanilide, a solid.

EXAMPLE IX

To a suitable reaction vessel equipped with a thermometer, agitator and reflux condenser is charged 2.5 parts by weight (substantially 0.01 mole) of 3-tert.pentyl-5-nitro-salicylic acid, 1.6 parts by weight (substantially 0.01 mole) of 2,5-dichloroaniline and approximately 88.5 parts by weight of monochlorobenzene. While agitating the so-charged mass is heated to about 65°C, whereupon 0.45 parts by weight (substantially 0.0033 mole) of phosphorus trichloride in admixture with approximately 12 parts by weight of monochlorobenzene is slowly added. Thereon the mass is heated to the reflux temperature (about 135°C) and refluxed for 10 hours. Upon cooling to room temperature after standing overnight, the monochlorobenzene and other volatiles are stripped off under reduced pressure. The solid residue is first washed with dilute aqueous sodium bicarbonate and then with water. The so-washed solid is then recrystallized from an ethanol-water mixture to give solid 2',5'-dichloro-3-tert.pentyl-5-nitrosalicylanilide.

EXAMPLE X

To a suitable reaction vessel equipped with a thermometer, agitator and reflux condenser is charged 2.7 parts by weight (substantially 0.01 mole) of 3-tert.pentyl-6-methyl-5-nitrosalicylic acid, 1.6 parts by weight (substantially 0.01 mole) of 2,5-dichloroaniline and approximately 88.5 parts by weight of monochlorobenzene. While agitating the so-charged mass is heated to about 65°C, whereupon 0.45 parts by weight (substantially 0.0033 mole) of phosphorus trichloride in admixture with approximately 12 parts by weight of monochlorobenzene is slowly added. Thereon the mass is heated to the reflux temperature (about 135°C) and refluxed for 10 hours. Upon cooling to room temperature after standing overnight, the monochlorobenzene and other volatiles are stripped off under reduced pressure. The solid residue is first washed with dilute aqueous sodium bicarbonate and then with water. The so-washed solid is then recrystallized from an ethanol-water mixture to give solid 2',5'-dichloro-3-tert.pentyl-6-methyl-5-nitrosalicylanilide.

Other 2',5'-dihalo-3-tert.alkyl-5-nitrosalicylanilides of this invention prepared as aforedescribed include 2'-chloro-5'-fluoro-3-tert.butyl-5-nitrosalicylanilide,
2'-fluoro-5'-bromo-3-tert.butyl-5-nitrosalicylanilide,
2'-chloro-5'-bromo-3-tert.butyl-6-methyl-5-nitrosalicylanilide,
2',5'-dibromo-3-tert.pentyl-5-nitrosalicylanilide,
2',5'-difluoro-3-tert.pentyl-5-nitrosalicylanilide,
2'-chloro-5'-bromo-3-tert.pentyl-5-nitrosalicylanilide,
2',5'-dibromo-3-tert.pentyl-6-methyl-5-nitrosalicylanilide,
2',5'-difluoro-3-tert.pentyl-6-methyl-5-nitrosalicylanilide,
2'-chloro-5'-fluoro-3-tert.pentyl-6-methyl-5-nitrosalicylanilide, etc.

The salicylanilide compounds of this invention are particularly useful in combatting chewing insect larvae species of the order Lepidoptera, particularly larvae species of the family Noctuidae, and to illustrate such but not limitative thereof is the following:

a. Cotton bollworm larvae

Respective solutions of the salicylanilide to be evaluated (itemized in Table I below) are prepared by dissolving same in sufficient acetone to provide respective concentrations of the particular salicylanilide of 10.0 micrograms per microliter and 1.0 microgram per microliter. One microliter of one of these solutions via a microinjection apparatus is applied directly upon the dorsum of the thorax of each of 10 cotton bollworm larvae (*Heliothis zea*) which 10 so treated larvae are placed immediately in a vial containing an agar base rearing medium therefor, and one microliter the other solution via a microinjection apparatus is applied directly upon the dorsum of the thorax of each of 10 cotton bollworm larvae (*Heliothis zea*) which 10 so treated larvae are placed immediately in a vial containing an agar base rearing medium therefor. Two replicates were included for each salicylanilide. Forty-eight hours at 80°F after the placement in the vial mortality observations were made. The average percent mortality for each salicylanilide at the respective concentrations of 10.0 and 1.0 micrograms per larva was found to be as follows:

TABLE I

| Salicylanilide | % kill at a conc. in micrograms per larva of | |
|---|---|---|
| | 10.0 | 1.0 |
| 2',5'-dichloro-3-tert.butyl-5-nitro-salicylanilide | 100 | 40 |
| 2',5'-dichloro-3-tert.butyl-6-methyl-5-nitrosalicylanilide | 90 | 60 |
| 2',5-dichloro-3-tert.butyl-4'-nitro-salicylanilide* | 50 | 0 |
| 2',5-dichloro-3-tert.butyl-6-methyl-4'-nitrosalicylanilide* | 60 | 0 |
| 2',5-dichloro-3-isopropyl-4'-nitro-salicylanilide* | 20 | 0 |
| 2',4',5-trichloro-3-tert.butyl-salicylanilide | 0 | 0 |

* U.S. 3,388,163 b. Southern armyworm larvae

Respective solutions of the salicylanilide to be evaluated (itemized in Table II below) are prepared by dissolving same in sufficient acetone to provide respective concentrations of the particular salicylanilide of 1.0 and 0.1 microgram per microliter. One microliter of one of these solutions via a microinjection apparatus is applied directly to each of 10 lima bean leaf discs 0.25 inch in diameter, and one microliter of one of the other solutions via a microinjection apparatus is applied directly to each of 10 lima bean leaf discs 0.25 inch in diameter. Thereafter individual second instar southern armyworm larvae (*Prodenia eridania*) are placed beside each leaf disc and the disc and larva encaged with a plastic cap 0.875 inch in diameter. Two replicates were included for each salicylanilide. Fortyeight hours of room temperature after the encagement mortality observations were made. The average percent mortality for each salicylanilide at the respective concentrations of 1.0 and 0.1 microgram per larva was found to be as follows:

TABLE II

| Salicylanilide | % kill at a conc. in microgram per larva of- | |
|---|---|---|
| | 1.0 | 0.1 |
| 2',5'-dichloro-3-tert.butyl-6-methyl-5-nitrosalicylanilide | 90 | 30 |
| 2',5-dichloro-3-tert.butyl-6-methyl-5'-nitrosalicylanilide * | 30 | 0 |
| 3',5-dichloro-3-tert.butyl-6-methyl-4'-nitrosalicylanilide * | 30 | 0 |
| 4',5-dichloro-3-tert.butyl-6-methyl-3'-nitrosalicylanilide * | 0 | 0 |
| 2',5'-dichloro-3-tert.butyl-5-nitrosalicylanilide | 100 | 70 |
| 2',5-dichloro-3-tert.butyl-5'-nitrosalicylanilide * | 70 | 0 |
| 4',5-dinitro-3-tert.butyl-2'-chlorosalicylanilide * | 60 | 0 |
| 3',4'-dichloro-3-phenyl-5-nitro-salicylanilide ** | 0 | 0 |
| 4',5-dichloro-3-tert.butyl-2'-nitro-salicylanilide * | 0 | 0 |
| 4',5-dichloro-3tert.butyl-3'-nitro-salicylanilide * | 40 | 0 |
| 2',5,5'-trichloro-3-tert.butyl-4'-nitrosalicylanilide * | 0 | 0 |
| 3',5-dichloro-3-tert.butyl-4'-nitro-salicylanilide * | 70 | 0 |
| 2',5-dichloro-4'-nitrosalicylanilide * | 0 | 0 |
| 2',5-dichloro-3-methyl-4'-nitro-salicylanilide * | 0 | 0 |
| 2',5-dichloro-3-ethyl-4'-nitro-salicylanilide * | 0 | 0 |
| 2',5-dichloro-3-isopropyl-4'-nitro-salicylanilide * | 0 | 0 |
| 3',5-dichloro-3-phenyl-4'-nitro-salicylanilide *** | 50 | 0 |
| 2',3,5-trichloro-4'-nitrosalicylanilide * | 0 | 0 |
| 2',5-dichloro-5'-nitrosalicylanilide * | 0 | 0 |
| 2',5-dichloro-3-(4-chlorophenyl)-5'-nitrosalicylanilide *** | 60 | 0 |
| 3',4',5-trichloro-3-nitrosalicyl-anilide * | 0 | 0 |

* described and the preparation thereof either specifically, generically or analogously from the appropriate substituted salicylic acid and the appropriate substituted aniline in the presence of phosphorus trichloride in U.S. 3,079,297 and U.S. 3,388,163.
** m.p. 250–253°C - prepared by heating at about 220–230°C an intimate equimolecular mixture of 3,4-dichloroaniline and phenyl 5-nitro-3-phenylsalicylate (m.p. 142.5–143.5°BC).
*** U.S. 3,382,145

Although the salicylanilides of this invention are useful per se in destroying Lepidoptera larvae, it is preferable that they be supplied to the larvae or to the environment of the larvae in a dispersed form in a suitable extending agent. The exact concentration of the salicylanilides of this invention employed in destroying said larvae can vary considerably provided the required dosage (i.e. toxic or larvicidal amount) thereof is supplied to the larvae or to the environment of the larvae. When the extending agent is a liquid or mixture of liquids (i.e. as in solutions, suspensions, emulsions, or aerosols) the concentration of the salicylanilide employed to supply the desired dosage generally will be in the range of 0.001 to 50 percent by weight. When the extending agent is a semi-solid or solid, the concentration of the salicylanilide employed to supply the desired dosage generally will be in the range of 0.1 to 25 percent by weight. From a practical point of view, the manufacturer must supply the user with a low cost concentrate or spray base or particulate solid base in such form that, by merely mixing with water or finely divided inert solid extender (e.g. powdered clay or talc) or other low cost material available to the user at the point of use, he will have an easily prepared larvicidal spray or particulate solid. In such a concentrate composition, the salicylanilide generally will be present in a concentration of 5 to 95 percent by weight, the residue being any one or more of the well known pesticidal adjuvants, such as the surface-active clays, solvents, diluents, carrier media, adhesives, spreading agents, humectants, and the like, but particularly a finely divided solid extender.

There are a large number of organic liquids which can be used for the preparation of solutions, suspensions or emulsions of the salicylanilides of this invention. For example, isopropyl ether, acetone, methyl ethyl ketone, octanone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400°F, and having a flash point above about 80°F, particularly kerosene), mineral oils having an unsulfonatable residue above about 80 percent and preferably above about 90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent, e.g. an aromatic hydrocarbon and an aliphatic ketone.

When the salicylanilides of this invention are to be supplied to the larvae or to the environment of the larvae as aerosols, it is convenient to dissolve them in a suitable solvent and disperse the resulting solution in dichlorodifluoromethene or like chlorofluoroalkane which boils below room temperature at atmospheric pressure.

The salicylanilides of this invention are preferably supplied to the larvae or to the environment of the larvae in the form of emulsions or suspensions. Emulsions or suspensions are prepared by dispersing the salicylanilides of this invention either per se or in the form of an organic solution thereof in water with the aid of a water-soluble non-ionic or anionic surfactant or mixtures thereof. The term "surfactant" as employed here and in the appended claims is used as in Volume II of Schwartz, Perry and Berch's "Surface Active Agents and Detergents" (1958, Interscience Publishers, Inc., New York) in place of the expression "emulsifying agent", to connote generically the various "emulsifying agents", "dispersing agents", "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides", second edition, page 280). The surfactants contemplated are the well-known capillary active substances which are non-ionic or anionic and which are described in detail in Volumes I and II of Schwartz, Perry and Berch's "Surface Active Agents and Detergents", (1958, Interscience Publishers, Inc., New York) and also in the November 1947 issue of Chemical Industries (pages 811–824) in an article entitled "Synthetic Detergents" by John W. McCutcheon and also in the July, August, September and October, 1952 issues of Soap and Sanitary Chemicals under the title "Synthetic Detergents". The disclosures of these articles with respect to non-ionizing capillary active substances are incorporated in this specification by reference in order to avoid unnecessary enlargement of this specification. The preferred surfactants are the water soluble anionic and non-ionic surface active agents set forth in U.S. Pat. No. 2,846,398 (issued Aug. 5, 1958).

The salicylanilides of this invention can be dispersed by suitable methods (e.g. tumbling or grinding) in solid extending agents either of organic or inorganic nature and supplied to the larvae environment in particulate form. Such solid materials include for example, tricalcium phosphate, calcium carbonate, kaolin, bole, kieselguhr, talc, bentonite, fuller's earth, pyrophillite, diactomaceous earth, calcined magnesia, volcanic ash, sulfur and the like inorganic solid materials, and include for example, such materials of organic nature as powdered cork, powdered wood, and powdered walnut shells. The preferred solid carriers are the adsorbent clays, e.g. bentonite. These mixtures can be used for larvicidal purposes in the dry form, or by addition of water-soluble anionic or non-ionic surfactants the dry particulate solids can be rendered wettable by water so as to obtain stable aqueous dispersions or suspensions suitable for use as sprays.

For special purposes the salicylanilides of this invention can be dispersed in a semi-solid extending agent such as petrolatum with or without the aid of solubility promoters and/or surfactants.

In all of the forms described above the dispersions can be provided ready for use in combatting the larvae or they can be provided in a concentrated form suitable for mixing with or dispersing in other extending agents. As illustrative of a particularly useful concentrate is an intimate mixture of a salicylanilide of this invention with a water-soluble anionic or non-ionic surfactant or mixtures thereof which lowers the surface tension of water in the weight proportions of 0.1 to 15 parts of surfactant with sufficient of the salicylanilide of this invention to make 100 parts by weight. Such a concentrate is particularly adapted to be made into a spray for combatting various forms of Lepidoptera larvae by the addition of water thereto. As illustrative of such a concentrate is an intimate mixture of 20 parts by weight of 2',5'3-tert.butyl-5-nitrosalicylanilide and 2 to 4 parts by weight of a water-soluble non-ionic surfactant such as the polyoxyethylene derivatives of $C_{8-12}$ alkyl substituted phenols such as nonylphenol or dodecylphenol.

Another useful concentrate adapted to be made into a spray for combatting Lepidoptera larvae is a solution (preferably as concentrated as possible) of a salicylanilide of this invention in an organic solvent therefor. The said liquid concentrate preferably contains dissolved therein a minor amount (e.g. 0.5 to 10 percent by weight of the weight of the new larvicidal agent) of a non-ionic or anionic surfactant, which surfactant is also water-soluble. As illustrative of such a concentrate is a solution of 2',5'-dichloro-3-tert.buty-6-methyl-5-nitrosalicylanilide in a mixture of xylene and 2-octanone which solution contains dissolved therein a water-soluble non-ionic surfactant such as the polyoxyethylene derivatives of $C_{8-12}$ alkyl substituted phenols such as nonylphenol and dodecylphenol.

In all of the various dispersions described hereinbefore for larvicidal purposes, the active ingredient can be one or more of the salicylanilides of this invention. The salicylanilides of this invention can also be advantageously employed in combination with other pesticides, including, for example, nematocides, bactericides, fungicides, and herbicides. In this manner it is possible to obtain mixtures which are effective against a wide variety of pests and other forms of noxious life.

In the destruction of Lepidoptera larvae the salicylanilides of this invention either per se or compositions comprising same are supplied to the larvae or to their environment in a toxic or larvicidal amount. This can be done by dispersing the new Lepidoptera larvicidal agent or larvicidal composition comprising same in, on or over an infested environment or in, on or over an environment the larvae frequent, e.g. agricultural soil or other growth media or other media attractable to the larvae for habitational or sustenance purposes, in any conventional fashion which permits the larvae to be subject to the larvicidal action of the salicylanilides of this invention. Such dispersing can be brought about by applying sprays or particulate solid compositions to a surface infested with the larvae or attractable to the larvae, as for example, the surface of an agricultural soil or other habitat media such as the above ground surface of host plants by any of the conventional methods, e.g. power dusters, boom and hand sprayers, and spray dusters. Also for sub-surface application such dispersing can be carried out by simply mixing the new larvicidal agent per se or larvicidal spray or particulate solid compositions comprising same with the infested environment or with the environment the larvae frequent, or by employing a liquid carrier for the new larvicidal agent to accomplish subsurface penetration and impregnation therein.

What is claimed is

1. The method of combatting chewing insect larvae species of the order Lepidoptera which comprises applying to the above ground surface of host plants thereof a larvicidal amount of a 2',5'-dihalo-3-tert.butyl-5-nitrosalicylanilide of the formula

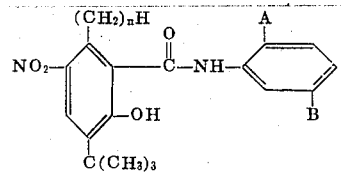

wherein $n$ is an integer from 0 to 1, inclusive, wherein A and B respectively are halogen of atomic weight in the range of 18 to 80.

2. The method of combatting chewing insect larvae species of the order Lepidoptera which comprises applying to the above ground surface of host plants thereof a larvicidal amount of a 2',5'-dichloro-3-tert.butyl-5-nitrosalicylanilide of the formula.

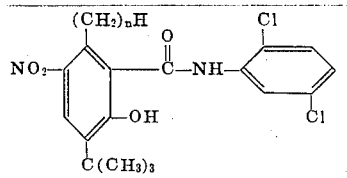

wherein $n$ is an integer from 0 to 1, inclusive.

3. The method of claim 2 wherein n is 0 and the chewing insect larvae species is of the family Noctuidae.

4. The method of claim 3 wherein the chewing insect larvae species is *Heliothis zea*.

5. The method of claim 3 wherein the chewing insect larvae species is *Prodenia eridania*.

* * * * *